US011279172B2

(12) United States Patent
Ferrero

(10) Patent No.: US 11,279,172 B2
(45) Date of Patent: Mar. 22, 2022

(54) MODULAR WHEEL-HUB BEARING UNIT

(71) Applicant: Aktiebolaget SKF, Gothenburg (SE)

(72) Inventor: Alessandro Ferrero, Shanghai (CN)

(73) Assignee: Aktiebolaget SKF

( * ) Notice: Subject to any disclaimer, the term of this patent is extended or adjusted under 35 U.S.C. 154(b) by 669 days.

(21) Appl. No.: 16/109,909

(22) Filed: Aug. 23, 2018

(65) Prior Publication Data

US 2019/0070896 A1    Mar. 7, 2019

(30) Foreign Application Priority Data

Sep. 5, 2017 (IT) .................... IT202017000099244

(51) Int. Cl.
*B60B 27/00* (2006.01)
*B60B 27/02* (2006.01)
*F16C 19/18* (2006.01)

(52) U.S. Cl.
CPC .......... *B60B 27/0005* (2013.01); *B60B 27/02* (2013.01); *F16C 19/184* (2013.01); *B60B 2900/112* (2013.01); *B60B 2900/325* (2013.01); *F16C 2240/70* (2013.01); *F16C 2326/02* (2013.01)

(58) Field of Classification Search
CPC .............. B60B 27/0005; B60B 27/001; B60B 27/0015; B60B 27/0047; B60B 27/0078; B60B 27/02; B60B 2900/112; B60B 2900/325; F16C 19/184; F16C 2326/02
See application file for complete search history.

(56) References Cited

U.S. PATENT DOCUMENTS

| 4,427,242 | A | * | 1/1984 | Otto | ...................... B60B 27/001 384/486 |
| 2008/0304785 | A1 | * | 12/2008 | Stephan | ................ B60B 27/001 384/569 |
| 2011/0135240 | A1 | * | 6/2011 | Hirai | ................... B60B 27/0042 384/589 |
| 2013/0278046 | A1 | * | 10/2013 | Ciulla | ................... F16C 33/723 301/105.1 |

FOREIGN PATENT DOCUMENTS

| DE | 19538212 A1 | 4/1997 |
| EP | 0904956 A2 | 3/1999 |
| EP | 2682278 A1 | 1/2014 |

* cited by examiner

Primary Examiner — Scott A Browne
(74) Attorney, Agent, or Firm — Reed Smith LLP

(57) ABSTRACT

A modular wheel-hub bearing unit having an outer flanged hub for mounting the unit on an upright of a vehicle, provided externally with an assembly surface and internally with a mounting seat; and a bearing provided with an outer ring, two inner rings and two rows of rolling elements arranged between the outer ring and the two inner rings. The bearing being mounted inside the assembly seat independently of the outer flanged hub and having an outer diameter, the dimensions of which are related to the dimensions of an outer diameter of the assembly surface of the flanged hub by a first coefficient ($\alpha$) according to the relation: $D2=\alpha*D1$, where $0.80 \leq \alpha \leq 0.95$.

4 Claims, 2 Drawing Sheets

MODULAR WHEEL-HUB BEARING UNIT

CROSS-REFERENCE

This application claims priority to Italian utility model no. 202017000099244 filed on Sep. 5, 2017, the contents of which are fully incorporated herein by reference.

TECHNOLOGICAL FIELD

The present innovation relates to a modular wheel-hub bearing unit.

BACKGROUND

The wheel-hub bearing units of the known type, such as that shown in FIG. 1 indicated by "Prior Art", are wheel-hub bearing units comprising a flanged outer hub 11 for fastening the unit to an upright of a vehicle, a flanged inner hub 12 for connecting the unit to a wheel of the vehicle, and a rolling bearing 2 incorporated in the two hubs 11 and 12, namely a rolling bearing 2 comprising an outer ring 21 defined by the outer hub 11, an inner ring 22 defined by the inner hub 12, and a double row of rolling elements 23 arranged between the outer ring 21 and the inner ring 22 for rotation of the inner ring 22 about a central axis A of the wheel-hub bearing unit.

The wheel-hub bearing units of the type described hitherto are normally called third generation wheel-hub bearing units both with inner and outer hubs of the flanged type. If, on the other hand, only the outer hub is of the flanged type, the wheel-hub bearing units are normally called second generation wheel-hub bearing units: the description which follows, irrespective as to whether or not the flanges are present, will refer equally well to either type of wheel-hub bearing unit.

The wheel-hub bearing units both of the second generation type and of the third generation type with integrated bearing are advantageously used in the so-called "Original Equipment Market" (OEM), namely on new vehicles which are yet to be registered, where duration and stability performance characteristics at least equal to the expected working life of a vehicle are required, but are particularly costly in the case of maintenance of second-hand vehicles in the so-called "Vehicle Service Market" where the duration and stability performance characteristics required may also be inferior to those of the Original Equipment Market.

SUMMARY

The object of the present innovation is to provide a wheel-hub bearing unit which is practically dedicated to the so-called Vehicle Service Market and, while maintaining high performance standards, may also allow a reduction in production costs.

According to the present innovation a modular wheel-hub bearing unit having the characteristic features set forth in the attached claims is provided.

BRIEF DESCRIPTION OF THE DRAWINGS

The innovation will now be described with reference to the attached drawings which illustrate a non-limiting example of embodiment thereof, in which.

DETAILED DESCRIPTION

Figure 2:
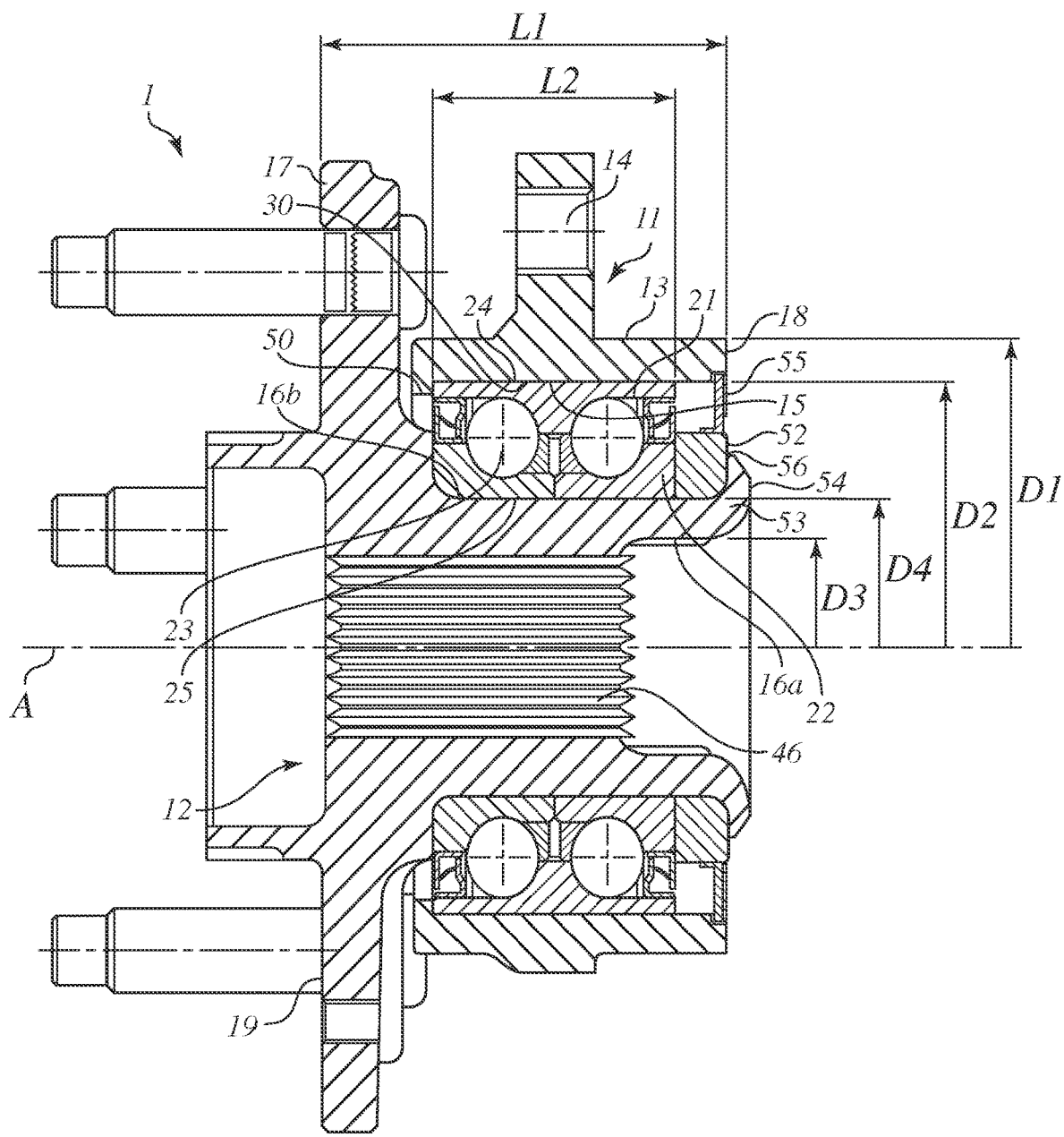
FIG. 2 shows a cross-section and side elevation view of a preferred non-limiting example of embodiment of the modular wheel-hub bearing unit according to the present innovation.

With reference to FIG. 2, using where possible the same reference numbers used in the introduction, 1 denotes overall a modular wheel-hub bearing unit having a central axis of rotation A and comprising a flanged outer hub 11 for fastening the unit 1 to an upright of a vehicle, and a flanged inner hub 12 for connecting the unit 1 to a wheel of the vehicle.

The flanged outer hub 11 has an outer cylindrical surface 13 having a diameter D1 and able to be engaged inside the said upright, a fastening flange 14 extending radially outwards from the surface 13, and an inner cylindrical surface 15 with a diameter D2.

The flanged inner hub 12 has, instead, an inner cylindrical surface 16a with a diameter D3 and, in the non-limiting example of embodiment illustrated here, is also provided with a splined profile 46 for assembling the unit 1 with a drive shaft of the vehicle, and a fastening flange 17 extending radially outwards from the surface 16 for connecting the unit 1 to the vehicle wheel. The flanged inner hub 12 has, moreover, an outer cylindrical surface 16b with a diameter D4, which faces and is coaxial with the surface 15 and defines together with the surface 15 a toroidal seat 30 extending around the axis A.

The outer hub 11 is axially bounded on the opposite side to the flange 17 by an annular surface 18 transverse to the axis A, while the inner hub 12 is axially bounded by a front surface 19 of the flange 17, also transverse to the axis A and arranged at an axial distance L1 from the annular surface 18, which defines an axial dimension typical of the unit 1 and depending on the application.

The dimensions of the diameters D1 and D3 and of the axial distance L1 of the unit 1, namely the dimensions of the outer hub 11 and the inner hub 12, are generally defined by the type of application of the unit 1 itself and therefore are not fully available within the design range of a manufacturer of wheel-hub bearing units, in particular if these units are intended for the so-called Vehicle Service Market. Since in wheel-hub bearing units such as those illustrated in the FIGURE "Prior Art", the integration of the bearing 2 forces the bearing manufacturer to use the same material both for the bearing 2 and for the outer hub 11 and the inner hub 12, this solution is not very advantageous from a cost point of view if it were to be adopted as such in the Vehicle Service Market.

Therefore, in order to make the production of the unit 1 very cost-effective, standardizing as far as possible the components of said unit 1, according to the present innovation the unit comprises a rolling bearing 2 which is totally independent of the outer hub 11 and the inner hub 12 and is inserted inside the toroidal seat 30.

Figure 1:
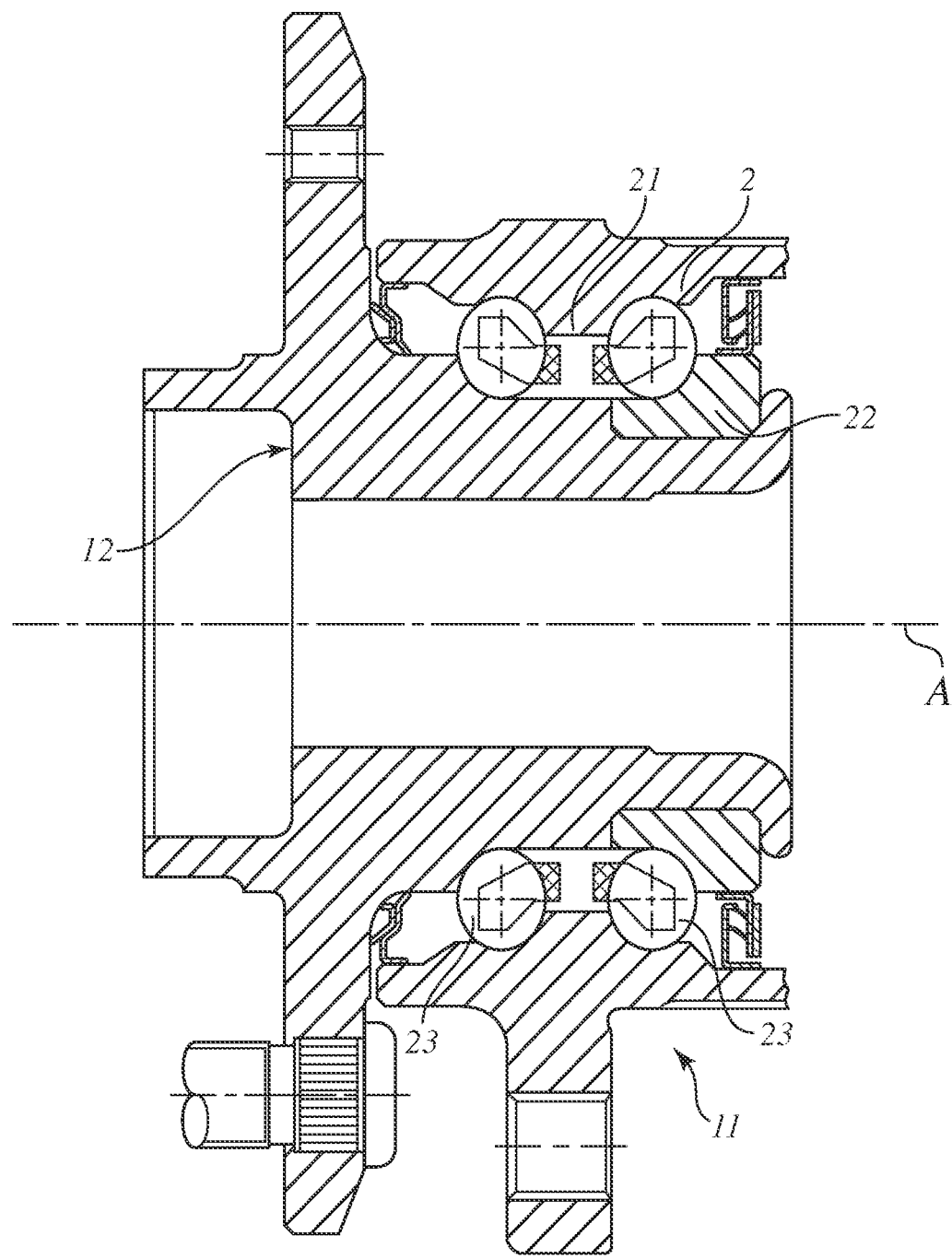
FIG. 1 labeled "Prior Art" shows a cross-section and side elevation view of a wheel-hub bearing unit of the known type.

In accordance with that shown in FIG. 1, the bearing 2 has an axial width L2 and comprises an outer ring 21, an inner ring 22 and a double row of rolling elements 23 arranged between the outer ring 21 and the inner ring 22 for rotation of the inner ring 22 about the central axis A of the wheel-hub bearing unit 1. In particular, the outer ring 21 is mounted inside the outer hub 11 and is radially bounded outwards by an outer cylindrical surface 24 arranged in contact with the cylindrical surface 15 and having a diameter D2 the same as the cylindrical surface 15, while the inner ring 22 is mounted on the outside of the inner hub 11 and is radially bounded inwards by an inner cylindrical surface 25 arranged in contact with the cylindrical surface 16b and having a diameter D4 the same as the cylindrical surface 16b.

In order to reduce the number of types of bearing 2 for the modular wheel-hub bearing unit 1, namely in order to use the same type of bearing 2 for different applications of the unit 1, and, moreover, in order to produce units 1 which always have high reliability and performance characteristics, despite the fact that the level thereof required for the Vehicle Service Market is not the same as the level required for the same units 1 in the Original Equipment Market, the results of tests carried out by the Applicant have shown that this result is achieved if the dimensions of the bearing 2 are determined on the basis of particular and innovative design rules. In particular, this result is achieved if the diameter D2 of the outer surface 24 of the bearing 2 and the diameter D1 of the outer cylindrical surface 13 are related by a coefficient α according to the following relation:

$$D2 = \alpha * D1$$

where $$0.80 \leq \alpha \leq 0.95$$

With a variation of the application, namely a variation of the diameter D2, the variation range of the coefficient α—said range having been recorded during the tests carried out by the Applicant—is such that the diameter D1 may be kept constant, namely the same bearing 2 may be designed and used for different applications of the unit 1. In particular, it has been noted that, if the value of the coefficient α is less than 0.80, the required raceway fatigue performance would not be guaranteed since the bearing 2 would have insufficient dimensions in terms also of the positional diameter and number of rolling elements 23. Instead, if the value of the coefficient α is greater than 0.95, it would not be possible to ensure the required fatigue performance since the outer hub 11 would have flanges which are too thin.

This result is moreover achieved if, preferably but necessarily, in combination with that described hitherto, the diameter D4 of the inner surface 25 of the bearing 2 and the diameter D3 of the outer cylindrical surface 16b are related by a coefficient β according to the following relation:

$$D4 = \beta * D3$$

where $$1.25 \leq \beta \leq 1.45$$

With a variation of the application, namely a variation of the diameter D3, the variation range of the coefficient β—said range having been recorded during the tests carried out by the Applicant—is such that the diameter D4 may be kept constant, namely the same bearing 2 may be designed and used for different applications of the unit 1. In particular, it has been noted that, if the value of the coefficient β is greater than 1.45, it would not be possible to ensure the required raceway fatigue performance since the bearing 2 would have too little space in relation to the outer hub 11 and it would be required to use rolling elements 23 which are too small in size. Instead, if the value of the coefficient β is smaller than 1.25, it would not be possible to ensure the required structural fatigue performance since the inner hub 12 would have flanges which are too thin.

Finally, the result described above is achieved, moreover, if, preferably but not necessarily in combination with that described hitherto, the axial width L2 of the bearing 2 and the axial distance L1 of the unit 1 are related by a coefficient δ according to the following relation:

$$L2 = \delta * L1$$

where $$0.50 \leq \delta \leq 0.75$$

With a variation of the application, namely a variation of the diameter L1, the variation range of the coefficient δ—said range having been recorded during the tests carried out by the Applicant—is such that the width L2 may be kept constant, namely the same bearing 2 may be designed and used for different applications of the unit 1.

In the preferred embodiment of the unit 1 shown in FIG. 1, the bearing 2 is axially locked inside the seat 30 by means of an axial shoulder 50 formed inside the seat 30 by the outer hub 11 and arranged against the outer ring 21 and by means of a cold-rolled edge 53 of the inner hub 12 which bears against the inner ring 22 via a spacer 52. Alternatively, according to an embodiment of the unit 1 which is not shown, but may be easily deduced from that described above, the cold-rolled edge 53 may also bear directly against the inner ring 22. In this case, the distance L to be taken into consideration in the innovative design rules described above is to be understood as being that between the front surface 19 of the flange 17 and an outer annular surface 54 of the edge 53. In the case where, instead, according to a preferred embodiment not illustrated, axial locking against the inner ring 22 is not performed by means of cold rolling, but instead by means of the direct pack-like closure with a shoulder of the bell member of a constant-velocity joint, the distance L to be taken into account in the innovative design rules described above is to be understood as being either as described above, namely that between the surface 18 and the surface 19, or that between an outer axial surface 56 of the spacer 52 and the surface 19.

In the unit 1 according to the present innovation, the spacer 52 may be advantageously used in those applications where the unit 1 must contain a phonic wheel 55 for the ABS device of the vehicle, while with the application of the innovative design rules described above, this phonic wheel 55 might no longer be able to be accommodated inside the bearing 2.

Alternatively, again, in the unit 1 described above, the outer ring 21 of the bearing 2, instead of being made as a single element as shown in FIG. 1, may comprise two outer rings separate from each other, each for a respective row of rolling elements 23.

Alternatively, according to an embodiment of the unit 1 which is not shown, but may be easily deduced from that described above, the outer ring 21 of the bearing 2, instead of being axially locked on one side only by means of a shoulder 50, may be axially locked on both sides by means of a shoulder, similar to the shoulder 50, and a cold-rolled edge which are formed by the outer hub 11.

The description above and the various embodiments described and illustrated in more or less detail are particularly suitable in the case where the wheel-hub bearing unit 1 is of the third generation type having both an inner hub 12 and an outer hub 11 of the flanged type. This description, with suitable modifications, but still subject to the same inventive ideas of the present innovation, may be applied also to second generation wheel-hub bearing units, namely those units where only the outer hub 11 is flanged, while the inner hub 12 is not flanged at all. In such cases, for application of the innovative design rules described above, the axial distance L1 will be equal to the axial width L2.

It is understood that the innovation is not limited to the embodiments which are described and illustrated here and which are to be regarded as examples of implementation of the wheel-hub bearing unit; the innovation instead may be subject to modifications relating to the form and arrangement of parts as well as constructional and operational details.

What is claimed is:

1. A modular hub-wheel bearing group comprises:
   an external flanged hub configured for assembling the group to an upright of a vehicle and externally provided with an assembly surface, and internally provided with a mounting seat comprising a cylindrical inner surface of the external flanged hub;
   an internal flanged hub configured for connecting the group to a vehicle wheel and externally comprising a cylindrical outer surface of the internal flanged hub having an outside diameter $D4$, the dimensions of which are related to the dimensions of an inside diameter $D3$ of the internal flanged hub by a coefficient according to the relation $D4=\beta*D3$ where $1.25 \leq \beta \leq 1.45$; and
   a bearing provided with an outer ring, two inner rings and two rows of rolling bodies interposed between the outer ring and the two inner rings; wherein
   the bearing is mounted in the mounting seat independently of the external flanged hub and has a cylindrical outer surface of the bearing arranged in contact with the cylindrical inner surface of the external flanged hub and having an outside diameter $D2$, the dimensions of which are related to the dimensions of an outside diameter $D1$ of the assembly surface of the external flanged hub by another coefficient according to the relation $D2=\alpha*D1$, where $0.80 \leq \alpha \leq 0.95$.

2. A modular hub-wheel bearing group comprises:
   an external flanged hub configured for assembling the group to an upright of a vehicle and externally provided with an assembly surface, and internally provided with a mounting seat comprising a cylindrical inner surface of the external flanged hub; and
   a bearing provided with an outer ring, two inner rings and two rows of rolling bodies interposed between the outer ring and the two inner rings; wherein
   the bearing is mounted in the mounting seat independently of the external flanged hub and has a cylindrical outer surface of the bearing arranged in contact with the cylindrical inner surface of the external flanged hub and having an outside diameter $D2$, the dimensions of which are related to the dimensions of an outside diameter $D1$ of the assembly surface of the external flanged hub by another coefficient according to the relation $D2=\alpha*D1$, where $0.80 \leq \alpha \leq 0.95$, wherein the bearing has an axial width $L2$ whose dimensions are related to the dimensions of an axial dimension $L1$ of the internal flanged hub by another coefficient according to the relation: $L2=\delta*L1$ where $0.50 \leq \delta 5 \leq 0.75$.

3. The modular hub-wheel bearing group according to claim 1, wherein the assembly surface of the external flanged hub has a cylindrical outer surface of the external flanged hub, wherein the outside diameter $D1$ is the outside diameter of the cylindrical outer surface of the external flanged hub.

4. A modular hub-wheel bearing group comprises:
   an external flanged hub configured for assembling the group to an upright of a vehicle and externally provided with an assembly surface, and internally provided with a mounting seat comprising a cylindrical inner surface of the external flanged hub;
   an internal flanged hub configured for connecting the group to a vehicle wheel and externally comprising a cylindrical outer surface of the internal flanged hub having an outside diameter $D4$, the dimensions of which are related to the dimensions of an inside diameter $D3$ of the internal flanged hub by a coefficient according to the relation $D4=\beta*D3$ where $1.25 \leq \beta \leq 1.45$, wherein the internal flanged hub has a cylindrical inner surface of the internal flanged hub, wherein the inside diameter $D3$ is the inside diameter of the cylindrical inner surface of the internal flanged hub; and
   a bearing provided with an outer ring, two inner rings and two rows of rolling bodies interposed between the outer ring and the two inner rings; wherein
   the bearing is mounted in the mounting seat independently of the external flanged hub and has a cylindrical outer surface of the bearing arranged in contact with the cylindrical inner surface of the external flanged hub and having an outside diameter $D2$, the dimensions of which are related to the dimensions of an outside diameter $D1$ of the assembly surface of the external flanged hub by another coefficient according to the relation $D2=\alpha*D1$, where $0.80 \leq \alpha \leq 0.95$.

\* \* \* \* \*